Oct. 21, 1958 W. E. CROMWELL 2,857,323
METHOD FOR OZONE GENERATION
Filed Oct. 20, 1955 6 Sheets-Sheet 1

INVENTOR
William E. Cromwell.
BY
Cameron, Kerkam & Sutton
ATTORNEYS

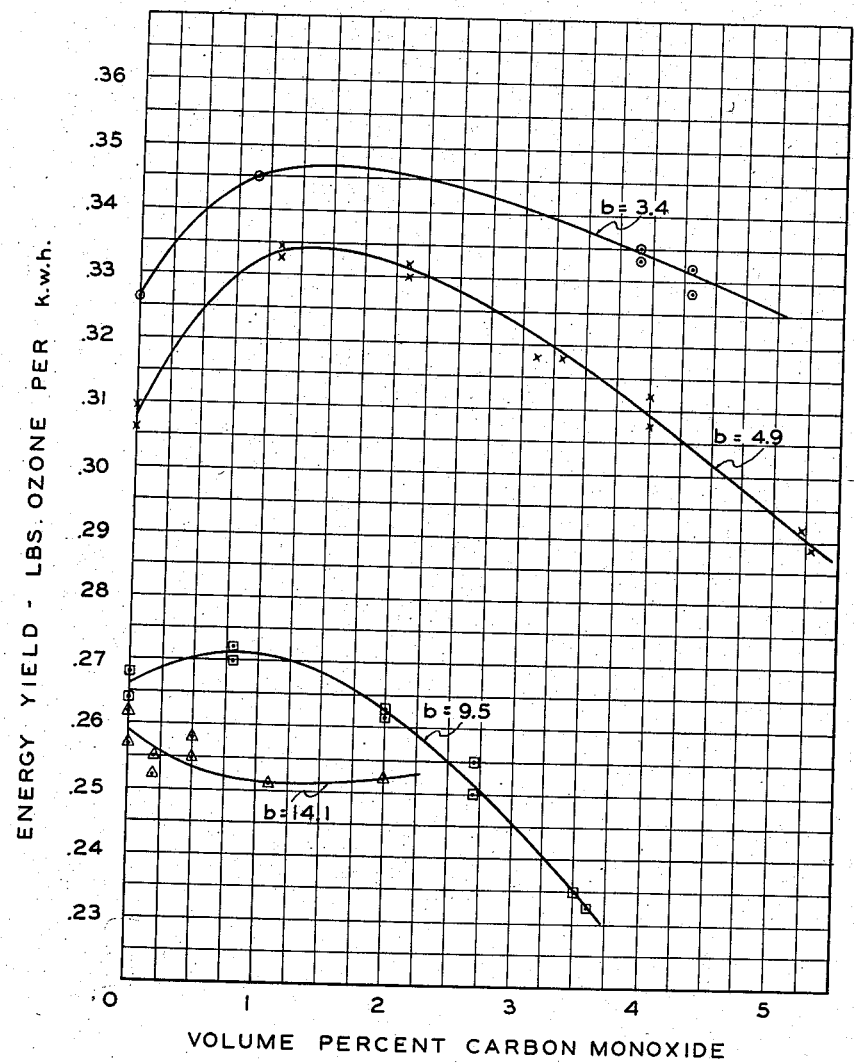

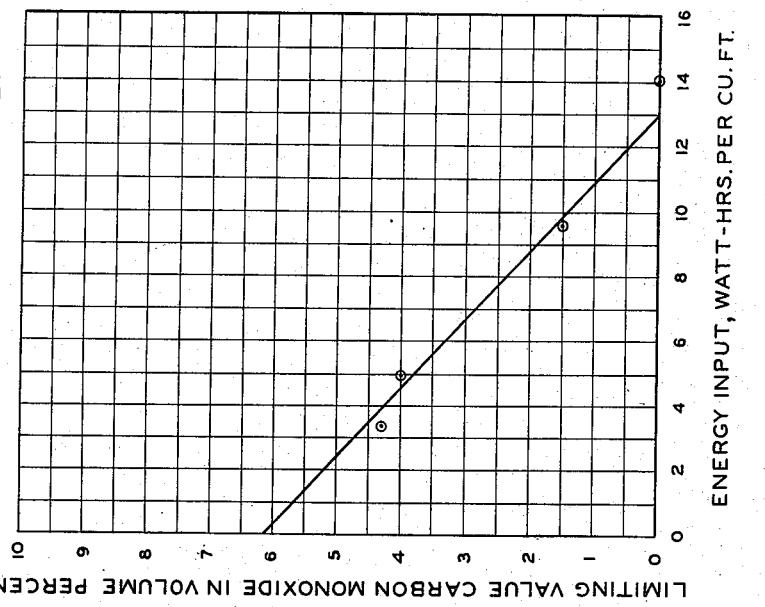
Fig. 6. Effect of energy input on limiting value of carbon monoxide for control of total production of ozone.
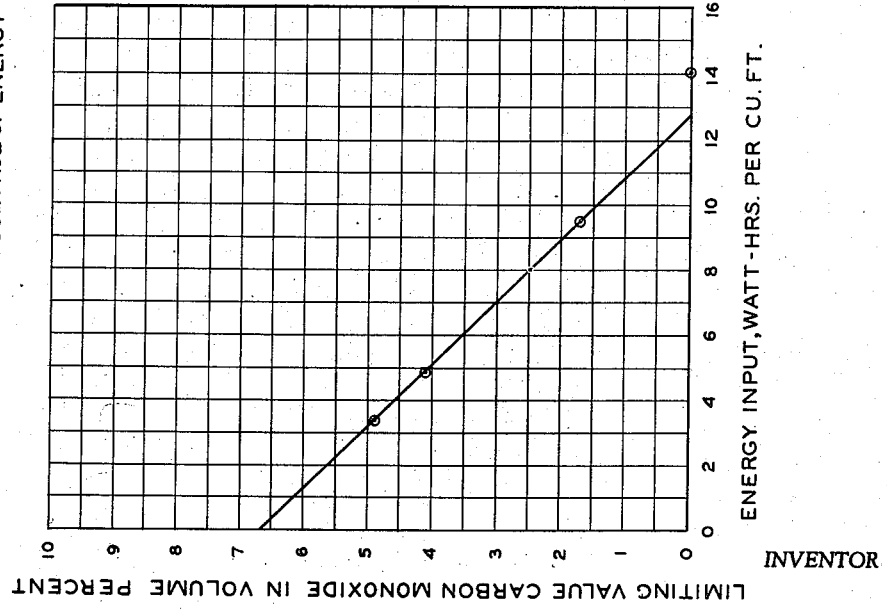
Fig. 4. Effect of energy input on limiting value of carbon monoxide for control of energy yield.
INVENTOR
*William E. Cromwell*
BY *Cameron, Kerkam & Sutton*
ATTORNEYS

EFFECT OF CARBON MONOXIDE ON TOTAL PRODUCTION OF OZONE

EFFECT OF CARBON MONOXIDE ON ENERGY YIELD

EFFECT OF CARBON MONOXIDE ON TOTAL PRODUCTION OF OZONE

INVENTOR
William E. Cromwell

Oct. 21, 1958   W. E. CROMWELL   2,857,323
METHOD FOR OZONE GENERATION
Filed Oct. 20, 1955   6 Sheets-Sheet 6

EFFECT OF CARBON MONOXIDE ON ENERGY YIELD

EFFECT OF CARBON MONOXIDE ON
TOTAL PRODUCTION OF OZONE

INVENTOR
*William E. Cromwell.*
BY *Cameron, Kerkam & Sutton*
ATTORNEYS

United States Patent Office 2,857,323
Patented Oct. 21, 1958

2,857,323
METHOD FOR OZONE GENERATION

William E. Cromwell, Titusville, N. J., assignor to The Welsbach Corporation, Philadelphia, Pa., a corporation of Delaware Application October 20, 1955, Serial No. 541,681

2 Claims. (Cl. 204—176)

This invention relates to methods and apparatus for ozone generation, and more particularly to such methods and apparatus in which gases heretofore considered as contaminants are employed to increase the energy yield of the apparatus with a resulting increase in the generation of ozone per kilowatt hour of energy supplied, or as total production, i. e. amounts of ozone produced by the ozone generator per unit time.

It has heretofore been generally accepted that the best yield of ozone is obtained by generating the ozone from pure oxygen, and that any admixture of foreign gases with the pure oxygen impaired the efficiency of the ozone generator and resulted in reduced ozone production. Contrary to this accepted belief and most unexpectedly it has been found that additions of small amounts of carbon monoxide to the oxygen actually increase the energy yield of ozone generation. This very important and unexpected discovery is the basis of the methods for ozone generation of the present invention for the apparatus employed for carrying out these methods.

It is accordingly an object of the present invention to provide novel methods and apparatus for ozone generation, in which increased efficiency, energy yield, is obtained in the generation of ozone with increased production by admixing small measured quantities of carbon monoxide with pure oxygen before it is admitted to the ozonator.

Another object of this invention is to provide methods and apparatus by which an improvement upon previously designed apparatus of the same general nature is achieved by reason of the novel use of the admission of a foreign gas to the oxygen before use in an ozonator.

Another object of this invention is to provide methods and apparatus by which greater economy in the use of oxygen is achieved by retaining the unused gases from an ozone consuming process and returning them to the ozonator.

Another object is to provide novel methods and apparatus for ozone generation in which increased energy yield and increased total production of ozone are obtained by regulating the amount of carbon monoxide present in the oxygen-bearing gases before admission to the ozonator.

The methods and apparatus of the present invention are capable of various procedural and mechanical embodiments and the illustrative description thereof, hereinafter set forth, should in no way be construed as defining or limiting the present invention, reference being had to the appended claims to determine its scope.

The accompanying drawings show illustrative apparatus for carrying out one embodiment of the methods of the present invention, and in these drawings in which like reference characters indicate like parts, Fig. 1 is a schematic representation of suitable apparatus for supplying measured quantities of pure oxygen and measured quantities of carbon monoxide to an ozonator including apparatus for conveying the ozone-bearing gas to a process in which it is to be used, and for returning it for re-use in the ozonator, including apparatus for measuring the carbon monoxide concentration and an apparatus for measuring the ozone concentration;

Fig. 3 is a graphic representation showing the increased energy yield of ozone compared to the volume percent of carbon monoxide employed;

Fig. 4 is a graphic representation of the limiting value of volume of carbon monoxide with respect to energy yield as compared to energy input;

Fig. 6 is a graphic representation showing the limiting value of volume of carbon monoxide with respect to total production of ozone as compared to the energy input;

Figure 7:
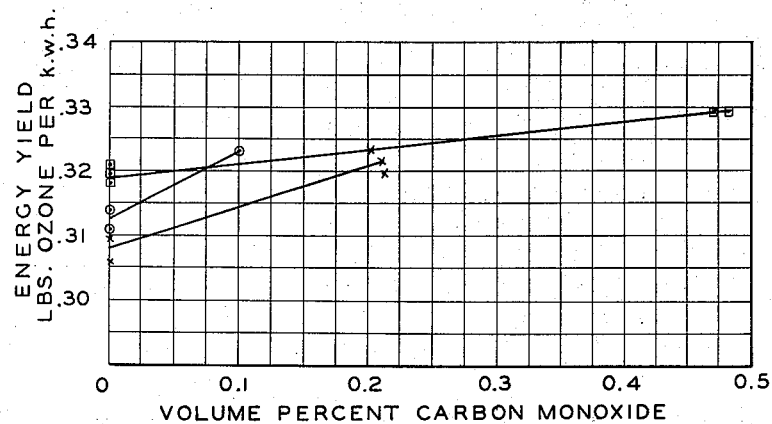
Figure 7A:
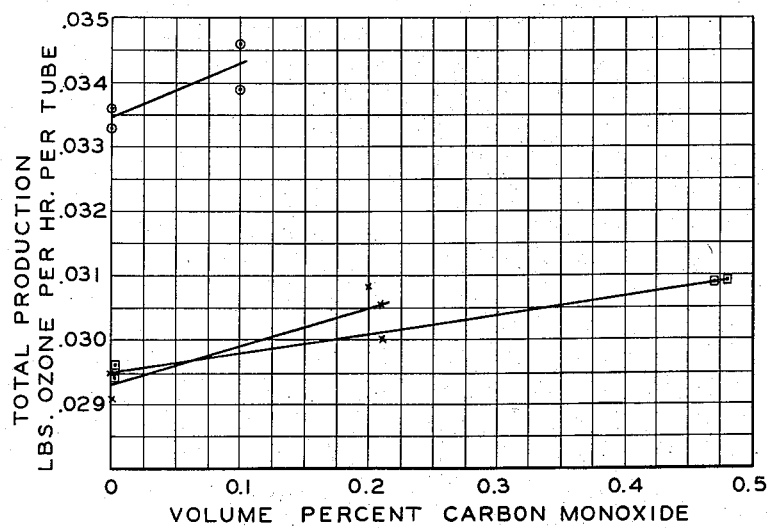
Figure 8:
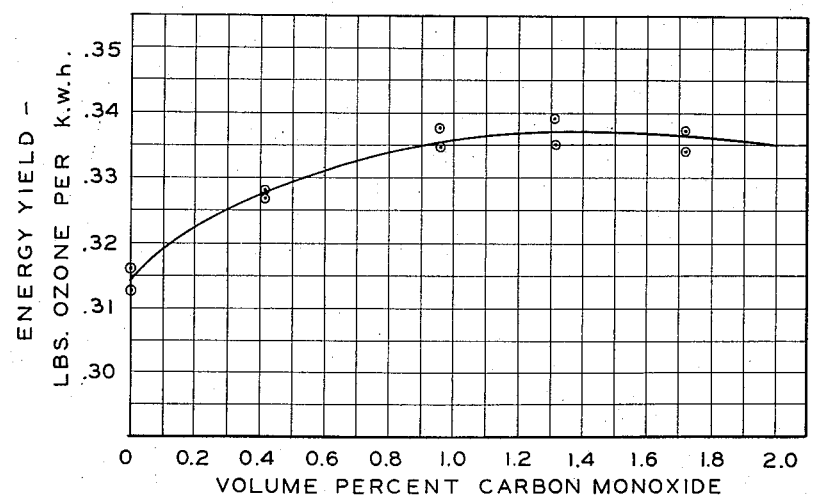
Figure 8A:
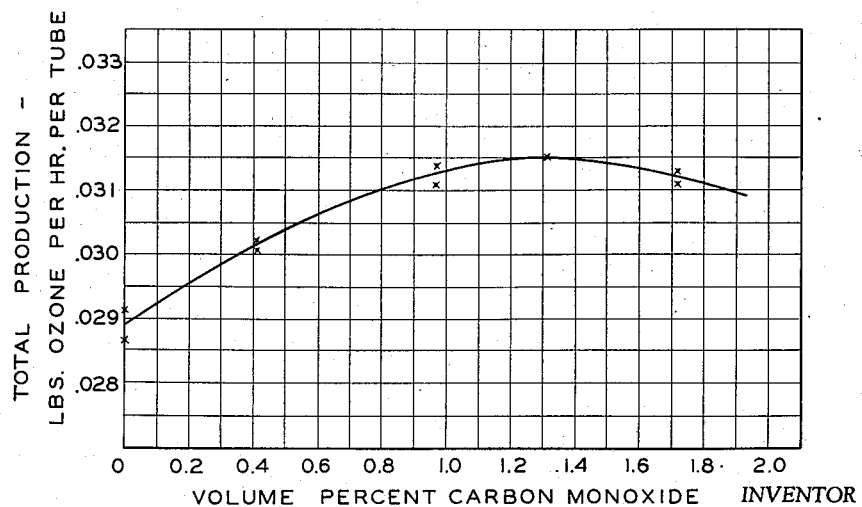

Fig. 7 is a graphic representation showing increased energy yield and Fig. 7a shows increased total production of ozone as compared to volume percent of carbon monoxide employed for values of carbon monoxide from $\frac{1}{10}$ of 1% up to $\frac{1}{2}$ of 1%; and Fig. 8 is a graphic representation showing increased energy yield and Fig. 8a shows total production of ozone compared to the volume percent of carbon monoxide employed for values of carbon monoxide from 0 up to 2%.

Figure 1:
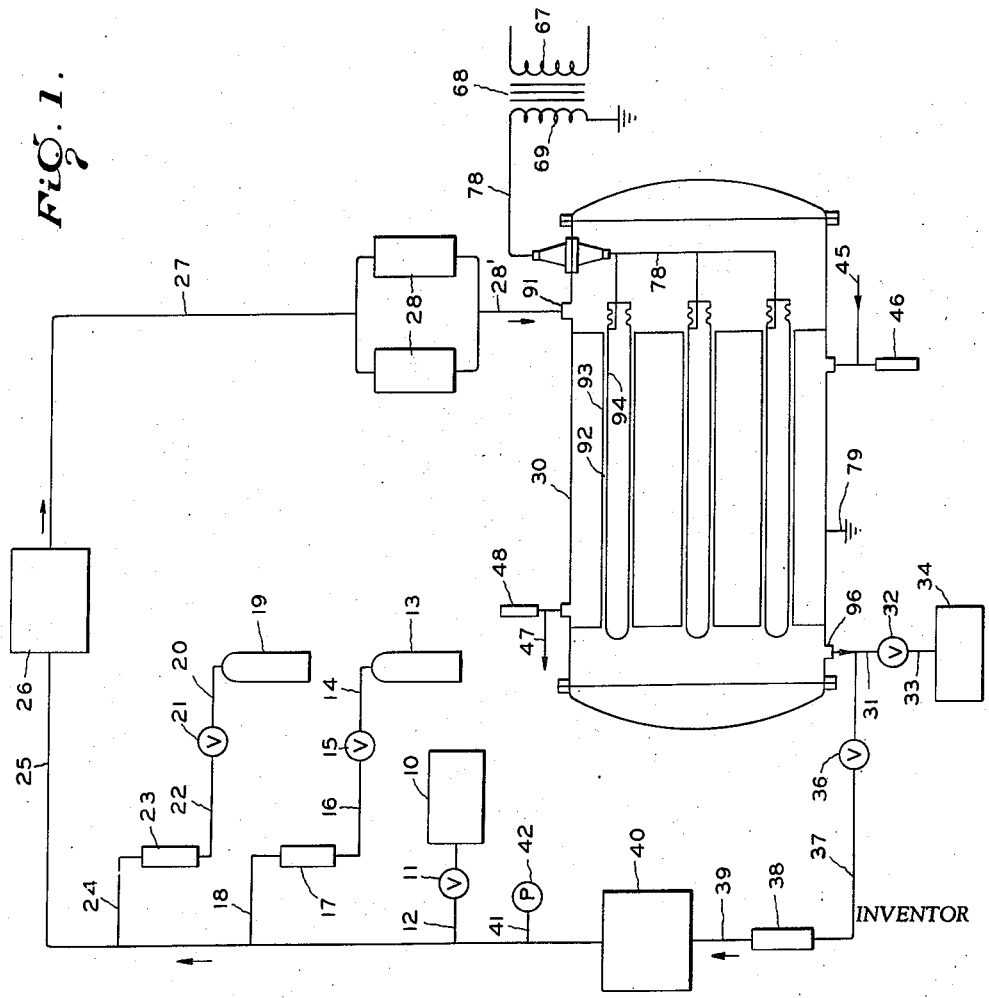

Referring now more particularly to Fig. 1, it will there be seen that oxygen from any suitable source 19, which may be pure oxygen or an oxygen rich gas mixture derived from a source not primarily utilized for the production of ozone as where oxygen is a by-product of a chemical reaction, is delivered through piping 20 to a valve 21 and to piping 22 which connects to a suitable gas volume measuring means for oxygen 23 which in turn connects to piping 24 and piping 24 connects to piping 25. Piping 25 connects to a suitable pressure regulating means 26 which is in turn connected by piping 27 to suitable gas drying means 28.

Carbon monoxide is obtained from a suitable source 13 which is connected by piping 14 to a suitable valve 15 which in turn is connected by piping 16 to a suitable gas volume measuring means for carbon monoxide 17. Measuring means 17 is connected by piping 18 to piping 25.

Gas drying means 28 is connected by piping 28' to a suitable ozonator 30 which is shown as of the discharge type. Gases including ozone are emitted from ozonator 30 at 96 and pass through piping 31, valve 32 and piping 33 to suitable ozone measuring means 34. These gases also pass through valve 36 and piping 37 to suitable total gas flow measuring means 38 and from total gas flow measuring means 38 the gases pass through piping 39 to any suitable ozone consuming process generally indicated at 40. Gases from the ozone consuming process 40 less the ozone then pass to piping 25. Suitable pressure measuring means 42 are connected by piping 41 into piping 25 and suitable carbon monoxide measuring means 10 are connected to piping 25 by piping 12 and valve 11.

Ozonator 30 is cooled by water from any suitable source admitted thereto through piping 45 and the intake temperature of this water is measured by thermometer 46. Cooling water is discharged from ozonator 30 through piping 47 and the temperature of the discharged cooling water is measured by thermometer 48.

Figure 2:
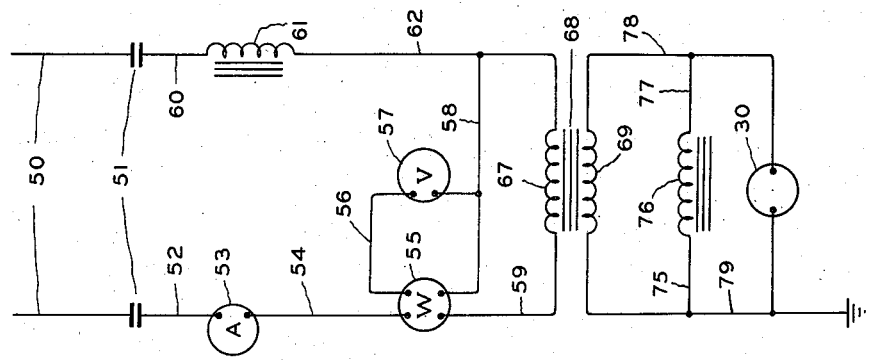
Fig. 2 is a circuit diagram of a suitable circuit for supplying electrical energy to the ozonator of Fig. 1.

Electric power is provided for ozonator 30 by the electric circuit shown diagrammatically in Fig. 2. In this circuit a suitable source of 60 cycle alternating current is generally indicated at 50 and connected to starting contactor means 51, which connects by wiring 52 and 60 to suitable current measuring means 53 and to a suitable low voltage induction coil 61, respectively. Means 53 is connected by wiring 54 to a suitable electric power measuring means 55 and means 55 is connected by wiring 56 to volt meter 57, volt meter 57 being connected by wiring 58 to means 55 and to wiring 62, wiring 62 connecting to induction coil 61. Power measuring means 55 is connected by wiring 59 to the low voltage primary windings 67 of transformer 68 and the other side of windings 67 is connected to wiring 62. High voltage secondary windings 69 of transformer 68 are connected by wiring 78 and 79 to ozonator 30 and wiring 79 leads to ground. A high voltage induction coil 76 is connected across wiring 78 and 79 by wiring 77 and 75, respectively.

Ozonator 30 is of the so-called ozonator discharge type and is well known being described in Encyclopedia of Chemical Technology, volume 9, 1952, pages 740–747, among others.

Ozonator 30 is made of stainless steel and is so arranged that the gas mixture is admitted at 91 from piping 28' and passes through the space 92 between the jacket 93 and glass dielectric 94. The ozone and other gases are emitted at 96 into piping 31 and 37, as described above. The hollow glass dielectric closed-end tube 94 is internally coated with an electrically conducting material and the above-described electric circuit is connected to said coating through wiring 78. Tube 94 is suitably spaced from jacket 93 to provide a suitable corona discharge space generally indicated at 92. Jacket 93 and ozonator 30 are grounded through wiring 79, as described above.

In the tables of data hereinafter the following symbols are employed:

$V$ = total gas flow rate, cubic feet per minute per tube reduced to 760 mm. Hg, 25° C. and dry.
$W_2$ = electric power, watts per tube corrected for meter and transformer losses.
$P$ = absolute ozonator pressure, p. s. i.
$t_w$ = temperature of cooling water, ° C.
$b$ = energy input concentration, watt-hrs. per cu. ft. of gas treated.
$B$ = energy yield of ozone generation, lbs. of ozone per kwh.

When measured amounts of carbon monoxide are mixed with the oxygen admitted to ozonator 30 or when the carbon monoxide content of the oxygen rich gases is adjusted before admission to the ozonator, a surprising and unexpected increase in efficiency of ozone generation is found when the carbon monoxide content is maintained at a certain optimum value of the total volume of the mixed gases. The following tables employing the symbols described above, show the increased efficiency of ozone generation when the quantity of carbon monoxide mixed with the oxygen is controlled before admission to the ozonator in the processes and apparatus described above.

Various theories may be advanced for this surprising and unexpected result, but none can be proved and discussion of them is omitted so as not to burden unduly this specification.

TABLE I

Oxygen and carbon monoxide mixtures

| | |
|---|---|
| Date | 8–19–55. |
| V | 0.49 s. c. f. m. |
| $W_2$ | 100±1 watts. |
| $t_w$ | 27° C. |
| P | 20.5 p. s. i. |
| b | 3.4 watt-hrs. per cu. ft. |

| Trial | Production, Lbs. Ozone Per Hr. Per Tube | Energy Yield, Lbs. Ozone Per kwh. | Volume Percent Carbon Monoxide |
|---|---|---|---|
| 1 | 0.0330 | 0.326 | 0 |
|   | .0345 | .345 | 0.9 |
| 2 | .0336 | .335 | 3.9 |
| 3 | .0336 | .333 | 3.9 |
|   | .0329 | .328 | 4.3 |
| 4 | .0331 | .332 | 4.3 |

TABLE II

Oxygen and carbon monoxide mixtures

| | |
|---|---|
| Date | 8–16–55. |
| V | 0.31 s. c. f. m. |
| $W_2$ | 90±2 watts. |
| $t_w$ | 26° C. |
| P | 21.4 p. s. i. |
| b | 4.9 watt-hrs. per cu. ft. |

| Trial | Production, Lbs. Ozone Per Hr. Per Tube | Energy Yield, Lbs. Ozone Per kwh | Volume Percent Carbon Monoxide |
|---|---|---|---|
| 1 | 0.0281 | 0.306 | 0 |
|   | .0281 | .309 | 0 |
| 2 | .0307 | .334 | 1.1 |
|   | .0303 | .333 | 1.1 |
| 3 | .0300 | .330 | 2.1 |
|   | .0299 | .332 | 2.1 |
| 4 | .0293 | .318 | 3.1 |
|   | .0295 | .312 | 4.0 |
| 5 | .0265 | .292 | 5.2 |
|   | .0263 | .289 | 5.3 |

TABLE III

Oxygen and carbon monoxide mixtures

| | |
|---|---|
| Date | 8–18–55. |
| V | 0.16 s. c. f. m. |
| $W_2$ | 91±1 watts. |
| $t_w$ | 27° C. |
| P | 21.2 p. s. i. |
| b | 9.5 watt-hrs. per cu. ft. |

| Trial | Production, Lbs. Ozone Per Hr. Per Tube | Energy Yield, Lbs. Ozone Per kwh. | Volume Percent Carbon Monoxide |
|---|---|---|---|
| 1 | 0.0242 | 0.264 | 0 |
|   | .0243 | .268 | 0 |
| 2 | .0244 | .272 | 0.8 |
|   | .0245 | .270 | 0.8 |
| 3 | .0241 | .262 | 2.0 |
|   | .0237 | .263 | 2.0 |
| 4 | .0229 | .255 | 2.7 |
|   | .0227 | .250 | 2.7 |
| 5 | .0216 | .232 | 3.6 |
|   | .0214 | .235 | 3.5 |

TABLE IV

Oxygen and carbon monoxide mixtures

| | |
|---|---|
| Date | 8–23–55. |
| V | 0.11 s. c. f. m. |
| $W_2$ | 91±1 watts. |
| $t_w$ | 26° C. |
| P | 21.3 p. s. i. |
| b | 14.1 watt-hrs. per cu. ft. |

| Trial | Production, Lbs. Ozone Per Hr. Per Tube | Energy Yield, Lbs. Ozone Per kwh | Volume Percent Carbon Monoxide |
|---|---|---|---|
| 1 | 0.0236 | 0.262 | 0 |
|   | .0239 | .257 | 0 |
| 2 | .0230 | .251 | 1.1 |
|   | .0232 | .252 | 2.0 |
| 3 | .0234 | .255 | 0.5 |
|   | .0232 | .258 | 0.5 |
| 4 | .0231 | .252 | 0.2 |
|   | .0231 | .255 | 0.2 |

TABLE V

*Oxygen and carbon monoxide mixtures*

Date ......................... 8-4-55.
V ............................ 0.33 s. c. f. m.
$W_2$ ......................... 107±1 watts.
$t_w$ .......................... 30° C.
P ............................ 21.2 p. s. i.
b ............................ 5.4 watt-hrs. per cu. ft.

| Trial | Production, Lbs. Ozone Per Hr. Per Tube | Energy Yield, Lbs. Ozone Per kwh | Volume Percent Carbon Monoxide |
|---|---|---|---|
| 1 | .0333 | .311 | 0 |
|   | .0336 | .314 | 0 |
| 2 | .0339 | .323 | .10 |
|   | .0346 | .323 | .10 |

TABLE VI

*Oxygen and carbon monoxide mixtures*

Date ......................... 8-8-55.
V ............................ 0.31 s. c. f. m.
$W_2$ ......................... 95±1 watts.
$t_w$ .......................... 30° C.
P ............................ 21.4 p. s. i.
b ............................ 5.1 watt-hrs. per cu. ft.

| Trial | Production, Lbs. Ozone Per Hr. Per Tube | Energy Yield, Lbs. Ozone Per kwh | Volume Percent Carbon Monoxide |
|---|---|---|---|
| 1 | .0291 | .306 | 0 |
|   | .0295 | .310 | 0 |
| 2 | .0300 | .320 | 0.21 |
|   | .0305 | .321 | 0.21 |
| 3 | .0303 | .323 | 0.20 |
|   | .0303 | .323 | 0.20 |

TABLE VII

*Oxygen and carbon monoxide mixtures*

Date ......................... 8-10-55.
V ............................ 0.30 s. c. f. m.
$W_2$ ......................... 93±1 watts.
$t_w$ .......................... 28° C.
P ............................ 21.3 p. s. i.
b ............................ 5.2 watt-hrs. per cu. ft.

| Trial | Production, Lbs. Ozone Per Hr. Per Tube | Energy Yield, Lbs. Ozone Per kwh | Volume Percent Carbon Monoxide |
|---|---|---|---|
| 1 | 0.0294 | 0.320 | 0 |
|   | .0295 | .321 | 0 |
| 2 | .0296 | .318 | 0 |
|   | .0296 | .318 | 0 |
| 3 | .0309 | .329 | 0.47 |
|   | .0309 | .329 | 0.48 |

TABLE VIII

*Oxygen and carbon monoxide mixtures*

Date ......................... 8-12-55.
V ............................ 0.30 s. c. f. m.
$W_2$ ......................... 92±1 watts.
$t_w$ .......................... 27° C.
P ............................ 21.2 p. s. i.
b ............................ 5.1 watt-hrs. per cu. ft.

| Trial | Production, Lbs. Ozone Per Hr. Per Tube | Energy Yield, Lbs. Ozone Per kwh. | Volume Percent Carbon Monoxide |
|---|---|---|---|
| 1 | 0.0292 | 0.313 | 0 |
|   | .0287 | .316 | 0 |
| 2 | .0302 | .328 | 0.41 |
|   | .0301 | .327 | .41 |
| 3 | .0311 | .335 | .97 |
|   | .0314 | .338 | .97 |
| 4 | .0315 | .335 | 1.31 |
|   | .0315 | .339 | 1.31 |
| 5 | .0313 | .337 | 1.72 |
|   | .0311 | .334 | 1.72 |

From these tables and Fig. 3, it is apparent that the energy yield, lbs. of ozone per kwh., increases substantially as carbon monoxide is present in the oxygen up to 0.8%, up to 1.3%, and up to 1.5%, when the energy input, watt-hrs. per cu. ft. is 9.5, 4.9, and 3.4 respectively. It is also apparent that some gain in the energy yield can be expected when carbon monoxide is present in oxygen up to 1.7%, 4.1%, and 4.9% respectively. These limiting values of carbon monoxide are shown in Fig. 4, and are compared to energy input watt-hrs. per cu. ft. of gas treated.

From Fig. 4 it is apparent that no gain in energy yield can be expected from the presence of carbon monoxide in oxygen, when the energy input is greater than about 13 watt-hrs. per cu. ft. This is verified by the data in Table IV and Fig. 3, where the energy yield is reduced by the presence of carbon monoxide in oxygen when the energy input is 14.1 watt-hrs. per cu. ft.

From Fig. 4 it is also apparent that some gain in energy yield can be expected from the presence of carbon monoxide in oxygen, up to values of about 6% by volume for energy input values of about unity.

Figure 5:
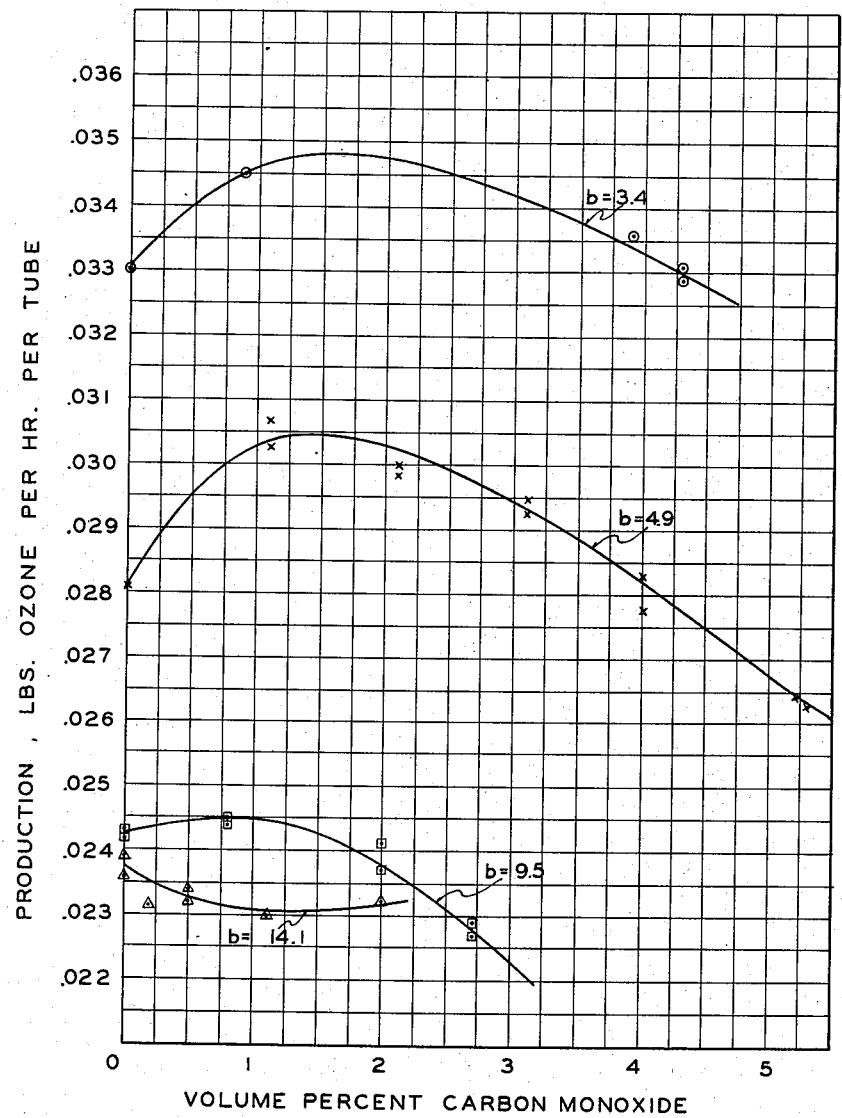
Fig. 5 is a graphic representation showing the increase in total production of ozone as compared to the volume percent of carbon monoxide employed.

From these tables and Figs. 5 and 6, it is apparent that some gain in ozone production as contrasted to energy yield can be expected from the presence of carbon monoxide in oxygen.

From these Tables and Figs. 7 and 8 it is apparent that the energy yield and the total production of ozone increases substantially as carbon monoxide is present in the oxygen in increments as low as 1/10 of 1%.

Commercial oxygen available for use in ozonators contains no measurable quantities of carbon monoxide. It is within the concept of this invention to control the amount of carbon monoxide by addition thereto, to obtain the above described advantages.

In the generation of ozone, the performance of the ozonator can be defined in terms of total pounds of ozone produced per unit time. This is the product of the ozone concentration and the total gas flow rate. The power necessary to produce this ozone is measured according to well known electrical methods. The energy yield of an ozonator such as pounds of ozone per kilowatt-hour of electric power, can then be computed.

The energy input, the ratio of the watt-hrs. of electric power and the cu. ft. of gas treated, is an independent variable. In the generation of ozone from ozonators which use large amounts of oxygen and electric power, the performance characteristics can be determined as a function of the energy input.

It is therefore within the concept of the present invention to control the carbon monoxide content of the oxygen gas mixture within certain limiting values as discussed above, which are determined by energy input values, in order to obtain the unexpected increase in energy yield and total production of ozone.

In the generation and use of ozone in amounts of several tons per day, the gas mixture, after passing from the ozonator and after use of the ozone may be recycled to the ozonator, as through piping 25 (Fig. 1). The recycled gas mixture has lost some oxygen (to the extent of the ozone produced and used) and may and usually does contain contaminants which should be removed. It is therefore within the concept of the present invention to control the carbon monoxide content of this recycled oxygen gas mixture, to some optimum value as discussed above, to obtain the unexpected increase of energy yield and production of ozone. This control is obtained by removal of carbon monoxide in excess of these optimum limits, or by addition of carbon monoxide or of oxygen to bring the gas mixture to the desired optimum composition.

It will now be apparent that by the present invention novel methods and apparatus for the generation of ozone, employing small amounts of carbon monoxide with increased efficiency of ozone generation has been provided which in every way satisfies the objects of this invention.

Changes in or modifications to the above described illustrative embodiment of the methods and apparatus of this invention may now be suggested to those skilled in the art without departing from the present inventive concept, and reference should be had to the appended claims to determine the scope thereof.

What is claimed is:

1. In a method for increasing the energy yield of ozone generation by a corona-type discharge ozonator continuously supplied with oxygen, the ratio of supplied electric power to oxygen being in the range from 1 to 13 watt-hrs. per cu. ft. of gas treated, the step of continuously mixing from 0.1 to 6.1% by volume of carbon monoxide with the oxygen before continuous admission to the ozonator.

2. In a method for increasing the energy yield of ozone generation by a corona-type discharge ozonator continuously supplied with an oxygen-gas mixture, the ratio of supplied electric power to oxygen being in the range from 1–13 watt-hrs. per cu. ft. of gas treated, the step of continuously controlling the content of carbon monoxide in the gas mixture to within the range of from 0.1 to 6.1% by volume of carbon monoxide.

References Cited in the file of this patent

UNITED STATES PATENTS

| | | |
|---|---|---|
| 1,756,897 | Bilsky | Apr. 29, 1930 |
| 2,271,895 | Hartman | Feb. 3, 1942 |

OTHER REFERENCES

La Coux: L'Ozone et ses Applications Industrielles (1904), pp. 109 to 112.

Pinkus et al.: "Journal de Chemie Physique," vol. 24 (1927), pp. 370 to 390.